United States Patent [19]

Heitmann et al.

[11] Patent Number: 4,496,231
[45] Date of Patent: Jan. 29, 1985

[54] MIRROR REFLEX CAMERA WITH EXPOSURE METER

[75] Inventors: Knut Heitmann, Wetzlar; Klaus-Dieter Schaefer, Braunfels, both of Fed. Rep. of Germany

[73] Assignee: Ernst Leitz Wetzlar GmbH, Wetzlar, Fed. Rep. of Germany

[21] Appl. No.: 400,253

[22] Filed: Jul. 21, 1982

[30] Foreign Application Priority Data

Jul. 23, 1981 [DE] Fed. Rep. of Germany ....... 3129069

[51] Int. Cl.³ ............................................. G03B 7/099
[52] U.S. Cl. .................................. 354/429; 354/478; 354/481
[58] Field of Search .............. 354/23 R, 31, 42, 49, 354/59, 54–56, 155, 219, 224, 225, 429, 433, 434, 478, 481, 483

[56] References Cited

U.S. PATENT DOCUMENTS 3,612,703 10/1971 Irisawa et al. .............. 354/56 X
3,732,775 5/1973 Warstat .......................... 354/56
4,188,102 2/1980 Schaefer ....................... 354/155 X Primary Examiner—William B. Perkey
Attorney, Agent, or Firm—Wells & Wells

[57] ABSTRACT

The exposure meter is used in mirror reflex cameras wherein an image of an object projected by a picture taking lens onto an image plane is observed by means of a pentaprism through an ocular. For the purpose of the selective integral or spot exposure metering, a pentaprism (6) is provided at the lower edge of its exit surface with a partly transmitting concave mirror (16). The angles of the pentaprism (6) are selected so that a portion of the light flux leaving the exit pupil (EP) of the picture-taking lens (2) is incident on this concave mirror (16). A first photoelectric detector system is associated with the concave mirror (16) and a second detector system is associated with the prism surface (6c) following the concave mirror in the direction of the beam path, and the output signals from these detectors control a display and/or an exposure control. An additional optical component (13,14a,15b,15) is provided to implement a desired beam path in the pentaprism (6).

8 Claims, 7 Drawing Figures 4,496,231

MIRROR REFLEX CAMERA WITH EXPOSURE METER

CROSS-REFERENCE TO RELATED APPLICATIONS

Applicants claim priority under 35 USC 119 for application No. P 31 29 069.8, filed July 23, 1981 in the Patent Office of the Federal Republic of Germany.

The disclosure of applicant Schaefer's copending application Ser. No. 320,075, filed Nov. 10, 1981, now U.S. Pat. No. 4,429,964, is incorporated herein to show the optical wedge 13 and application Ser. No. 358,194, filed Mar. 15, 1982, now U.S. Pat. No. 4,428,653, is incorporated herein to show wedge 11 used to deflect the exit pupil.

BACKGROUND OF THE INVENTION

The field of the invention is optics, measuring and testing. The present invention is particularly concerned with an apparatus for exposure metering in mirror reflex cameras wherein an image projected by a picture taking lens onto an image plane is observed by means of a pentaprism through an ocular.

The state of the art of the present invention may be ascertained by reference to U.S. Pat. No. 3,612,703 and West German Published Application 28 26 947, equivalent to U.S. patent application Ser. No. 48,693, filed June 14, 1979, and now abandoned the disclosures of which are incorporated herein.

U.S. Pat. No. 4,188,102 is incorporated herein to show that the exit pupil can be deflected by changing the angles of the pentaprism 7.

It is known for instance from U.S. Pat. No. 3,612,703 to measure the required exposure on the one hand for an image field portion representative of the overall image field, the so-called "large-field metering", and on the other hand merely for an especially important image field section, the so-called "spot" or "selective metering". Switching from one metering system to the other takes place for instance by using an at least partly transmitting mirror feeding the light associated with the central image area to a first detector and the light associated with the remaining area to one or more further detectors of which the output signals are fed to the analyzing electronic circuitry singly or in combination, that is, in an electrically switchable manner.

On the other hand, it is also known, for example, from West German Published Application No. 28 26 947, to feed light by optical means such as switchable lens elements or stops to the photoelectric detectors either from the entire area or only from a partial area.

However, these known arrangements suffer from the drawback that the splitting of the light fluxes by an at least partly transmitting mirror degrades the brightness of the entire viewer image.

SUMMARY OF THE INVENTION

Having in mind the limitations of the prior art, it is therefore an object of the present invention to provide an exposure metering means for mirror reflex cameras wherein the light fluxes passing through the picture-taking lens generate a bright viewer image and impinge on the photoelectric detectors in only slightly weakened form.

For the purpose of the selective integral or spot measurement this object is achieved by providing the pentaprism, by means of which the image of an object projected by an image taking lens onto an image plane is observed through an ocular, at the lower edge of its exit surface with a partly transmitting concave mirror, by selecting the angle of the pentaprism so that part of the light flux leaving the exit pupil of the picture taking lens impinges on the concave mirror, and by associating one photoelectric detector system with the concave mirror and another one with the prism surface following the concave mirror as seen in the direction of the light flux reflected by the concave mirror. The output signals of these detector systems supply a display and/or an exposure metering control.

For the purpose of integral or spot exposure metering, it is also possible to provide the pentaprism at the lower edge of its exit surface with a partly transmitting concave mirror, and to provide for the purpose of achieving a desired beam path in the pentaprism in addition to the concave mirror a supplementing optical component which, in cooperation with the pentaprism, assures that part of the light flux leaving the exit pupil of the picture-taking lens impinges on the concave mirror.

BRIEF DESCRIPTION OF THE DRAWINGS

The appended drawings show the invention in terms of schematic illustrative embodiments, wherein.

DESCRIPTION OF THE PREFERRED EMBODIMENTS

Figure 1:
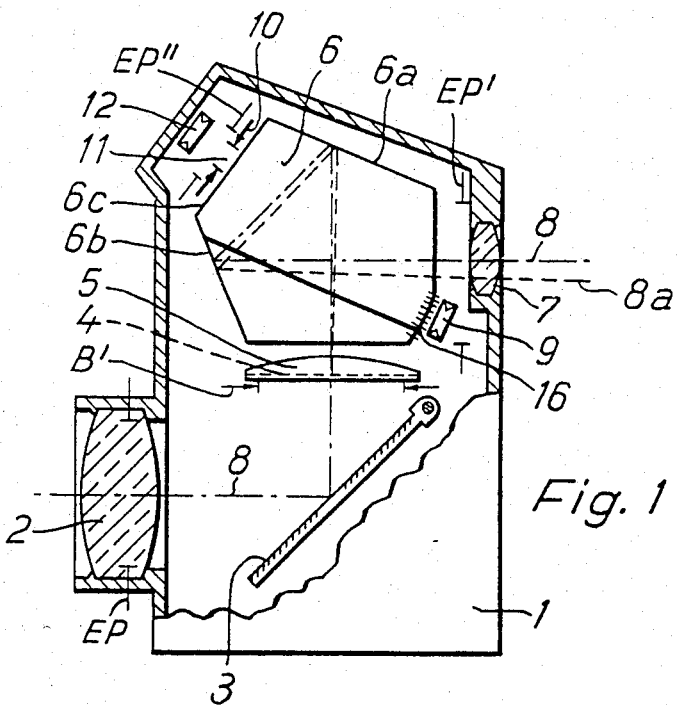
FIG. 1 is a schematic cross-section of a mirror reflex camera with an exposure meter of the invention.

FIG. 1 shows schematically a housing 1 of a mirror reflex camera comprising a picture taking lens 2 and a reflex mirror 3. A focusing screen 4 integral with a field lens 5 is located above the reflex mirror 3. An image B' of an object is projected via the reflex mirror 3 by the picture taking lens into the plane of the focusing screen 4 and is viewed by the user by means of an image erecting pentaprism 6 and an ocular 7 acting as a magnifier. The brightness of this image is directly proportional to the light flux density per unit area of the exit pupil EP of the lens 2. The field lens 5 is advantageously but not mandatorily a Fresnel lens and projects a real image EP' of the objective pupil EP onto the vicinity of the ocular 7, this real image EP' being substantially larger than the exit aperture of the ocular 7 on account of the predetermined spatial arrangement.

The dimensions of the pentaprism 6 are selected so that the optical axis 8 of the beam path after double reversal at the reflecting surfaces 6a and 6b in the pentaprism 6 leaves the housing 1 of the mirror reflex camera parallel to the optical axis of the picture taking lens 2 and in the rearward direction. The ocular 7 is arranged so that its axis coincides with the optical axis of the exiting beam. That part of the beam passing through the pentaprism 6 between the picture taking lens 2 and the ocular 7 is designated as the viewer beam. It is designated in the drawing with the reference 8 and is shown in dash-dot lines.

A partly transmitting concave mirror 16 is applied to the lower edge of the exit surface of the pentaprism 6 associated with the ocular 7.

Figure 2A:
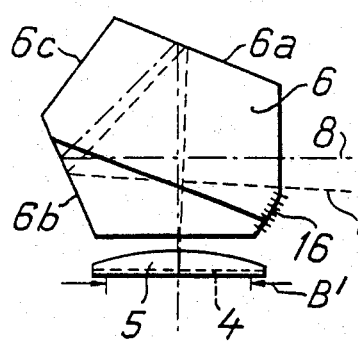
FIG. 2a is a detailed showing of the pentaprism 6, field lens 5 and focusing screen 4 of FIG. 1 wherein the angles of the reflecting surfaces 6a and 6b are selected to shift the pupil image EP' toward the concave mirror 16.

By appropriately selecting the angles of the reflecting surfaces 6a and 6b of the pentaprism, as indicated in FIG. 2a, it is possible to shift the pupil image EP′ toward the concave mirror 16 along axis 8a shown in dashed lines. Accordingly, only a partial light flux is fed to the eye of the user, for instance from the upper pupil area of the picture taking lens 2, while the light incident on the concave mirror 16 originates from the lower pupil half of the picture taking lens 2. A given portion determined by the partial silvering of the mirror, for instance 50% of the light, passes through the concave mirror 16 and impinges on a photoelectric detector system 9. This partial light flux is directly proportional to the total light flux through the pupil of the objective. Accordingly, the detector system 9 emits a signal which is proportional to the exposure in the entire image field.

The portion of the light flux reflected by the concave mirror 16 projects an intermediate image EP′ along axis 8c onto a prism surface 6c located after the concave mirror as seen in the direction 10. The light flux passing through the stop 10 is directly proportional to the average exposure in this central image field area. It is transformed by a subsequent second photoelectric detector system 12 into an electrical signal.

Figure 3:
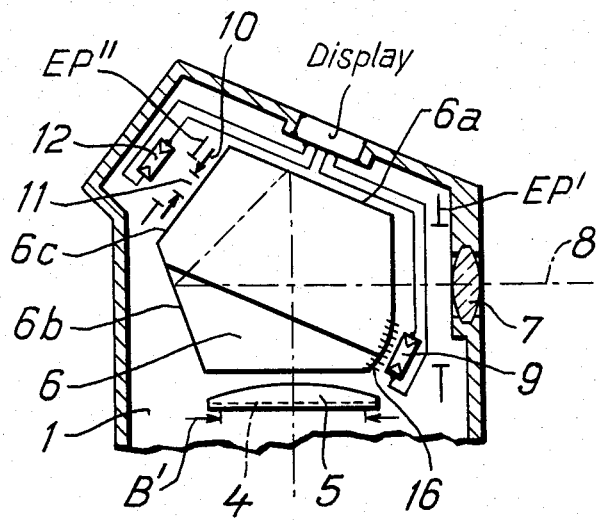
FIG. 3 is a showing of how the output signals of detectors 9 and 12 of FIG. 1 supply a diplay.
Figure 4:
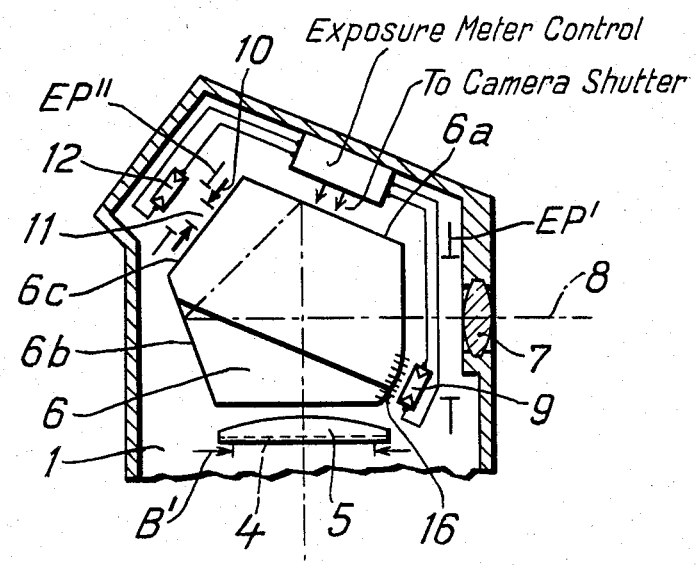
FIG. 4 is a showing of how the output signals of detectors 9 and 12 of FIG. 1 supply an exposure metering control.

The electrical signals from the two detection systems 9 and 12 are fed selectively in alternating manner or in a suitable combination to a display system, as shown in FIGS. 3 and 4 disclosed in U.S. Pat. No. 4,054,887 (display system).

As shown in FIG. 2a the shifting of the pupil can be sized in a manner that the optical beam axis 8a is located above the focusing screen 4 on the dividing line between the ocular 7 and the concave mirror 16 by as already described above appropriately selecting the angles between the reflecting surfaces 6a,6b,6c of pentaprism 6.

Figure 2B:
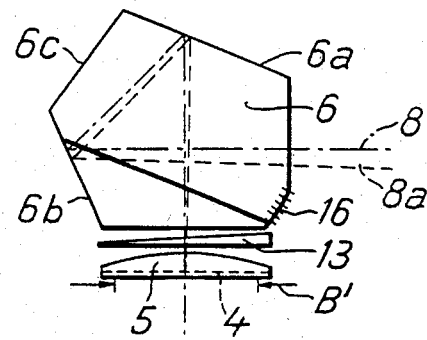
FIG. 2b is a detailed showing of the pentaprism 6, field lens 5 and focusing screen 4 of FIG. 1 wherein the pupil image EP' is shifted toward the concave mirror 16 by deflecting wedge 13.
Figure 2C:
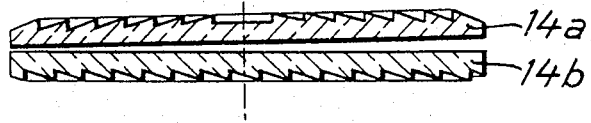
FIG. 2c is a detailed showing of stepped wedge gratings useful in FIG. 2b.
Figure 2D:
FIG. 2d is a detailed showing of a Fresnel screen 15 which is asymmetrical with respect to rotation for use as the Fresnel lens 5 of FIG. 1.

The desired shift of the pupil can be obtained in ways other than the shaping of the pentaprism 6 as shown in FIG. 2a. It can also be achieved by wedge means arranged in the plane of the focusing screen 4. Accordingly, FIG. 2b shows an additionally deflecting wedge 13 which, as shown in detail in FIG. 2c, also can be constructed as a stepped wedge grating 14a and 14b. Again, it is possible to achieve this wedge effect by a suitable design, asymmetrical with respect to rotation, of the Fresnel screen 15 itself, as shown by FIG. 2d. It is possible furthermore to laterally offset the optical axis of the Fresnel screen from the optical axis of the picture taking lens, because an eccentrically arranged lens element acts as a combination of lens element and wedge. However, such off-centering might negatively affect image quality for the case of large shifts.

Advantageously, the photoelectric detector system 12, after proper switching, can be used simultaneously as a component of a focus sensor.

Variations of the description above are possible. For instance, the stop 10 can be constructed as a variable stop. At least one of the detection systems 9 or 12 can be represented by a single detector. Again, one or more supplementing components can be provided at the pentaprism 6 in order to achieve the desired beam path.

We claim:

1. A mirror reflex camera comprising:
   (a) a picture taking objective having a horizontal optical axis and an exit pupil (EP) projected by said picture taking objective;
   (b) exposure metering means comprising first and second photoelectric detection systems (9,12);
   (c) a viewer system located along said optical axis comprising in series a focusing screen having a plane, a field lens, a pentaprism and an eyepiece, said optical axis offset in parallel from its original path by two reflections in said pentaprism and exiting said eyepiece;
   (d) said pentaprism having means (6b,6c) for deviating said exit;
   (e) mirror means comprising a partly transmitting concave mirror (16) provided at the lower edge of the exit surface of said pentaprism (6); said mirror means receiving light flux of said exit pupil for reflection to a surface (6c) of said pentaprism; and
   (f) said first photoelectric detection system located behind said concave mirror in the direction of said light flux and said second photoelectric detection system located behind said surface in the direction of said light flux reflected by said concave mirror.

2. The mirror reflex camera of claim 1, having at least one of said photoelectric detector systems (9,12) preceded by a stop (10).

3. The mirror reflex camera of claim 2, wherein said stop (10) is a variable stop.

4. The mirror reflex camera of claim 1, wherein said penta prism (6) has a first surface for the entry of light fluxes emanating from said exit pupil, a second (6a), a third (6b), a fourth and a fifth (6c) surface, said second surface receiving said light fluxes and reflecting same to said third surface; said third surface reflecting said light fluxes, a first portion of said light fluxes being transmitted by said fourth surface along said ocular axis and a second portion of said light fluxes being reflected by said concave mirror to said fifth surface; said fifth surface transmitting said second light flux portion to said second photoelectric detection means; said surfaces being arranged for defining said means for deviation.

5. A mirror reflex camera comprising:
   (a) a picture taking objective having a horizontal optical axis and an exit pupil (EP) projected by said picture taking objective;
   (b) exposure metering means comprising first and second photoelectric detection system (9,12);
   (c) a viewer system located along said optical axis comprising in series a focusing screen having a plane, a field lens, a pentaprism and an eyepiece, said optical axis offset in parallel from its original path by two reflections in said pentaprism and exiting said eyepiece;
   (d) mirror means comprising a partly transmitting concave mirror (16) provided at the lower edge of the exit surface of said pentaprism (6);
   (e) means (13) located in said plane and interacting with said pentaprism for optical deflection said exit pupil, a first portion (8a) of the light flux thereof impinging said mirror means while a second portion passes along said optical axis (8) in the vicinity of said eyepiece (7), said first portion reflected by said concave mirror to a surface (6c) of said pentaprism; and (f) said first photoelectric detection system located behind said concave mirror in the direction of said light flux and said second photoelectric detection system located behind said surface in the direction of said light flux reflected by said concave mirror.

6. The mirror reflex camera of claim 5, wherein said means for optically deflecting is a deflection wedge.

7. The mirror reflex camera of claim 5, wherein said means for optically deflecting is at least one stepped wedge grating.

8. The mirror reflex camera of claim 5, wherein said means for optically deflecting is said condensing lens comprising a Fresnel lens which is asymmetrical with respect to rotation.

* * * * *